April 23, 1940.  C. V. HADJEFF  2,198,511
LIQUID FUEL BURNER
Filed Dec. 16, 1935  2 Sheets-Sheet 1

INVENTOR
Charles V. Hadjeff
BY Thomas Gilyem
ATTORNEY

April 23, 1940.  C. V. HADJEFF  2,198,511
LIQUID FUEL BURNER
Filed Dec. 16, 1935  2 Sheets-Sheet 2

INVENTOR
Charles V. Hadjeff
BY Thomas Bieger
ATTORNEY

Patented Apr. 23, 1940

2,198,511

UNITED STATES PATENT OFFICE 2,198,511

LIQUID FUEL BURNER

Charles V. Hadjeff, Portland, Oreg.

Application December 16, 1935, Serial No. 54,578

5 Claims. (Cl. 158—53)

My invention is primarily intended for use in heating plants, both of the domestic and commercial type.

The primary purpose and object of the device is to increase the operating efficiency and combustion efficiency of the heating plant.

In my device I admit the fluid fuel stream to the burner head and I provide means for heating the same by applying the heat developed within the fire box and also for heating the same by electrical means. In advance of the fuel entering the heated-air stream that is to be delivered to the burner head I heat the fuel stream sufficiently to vaporize the same before the fuel stream mixes with the air stream that is also heated. I also preheat the air for combustion and mix the preheated air and the vaporized fuel within the confines of the burner head before the same are permitted to flow through a suitable nozzle arrangement and into the fire box where the combustion actually takes place.

A further object of my invention is to provide an adjustable supporting means for the burner head assembly to thereby position the burner head assembly in the furnace at the desired elevation.

A further object of my invention is to provide a support so as to position the burner heating assembly and form a contact therewith within the inner walls of the furnace to predetermine and regulate the amount of air that is being admitted into the combustion chamber. This enables me to precisely regulate the combustion of the fuel to be burned. I also preheat the fuel as well as preheat the air in advance of burning the same.

With these and incidental objects in view, the invention consists in certain novel features of construction and combination of parts, the essential elements of which are set forth in the appended claims, and a preferred embodiment of which is hereinafter shown with reference to the drawings which accompany and form a part of this specification.

In the drawings.

Like reference characters refer to like parts throughout the several views.

Figure 1:
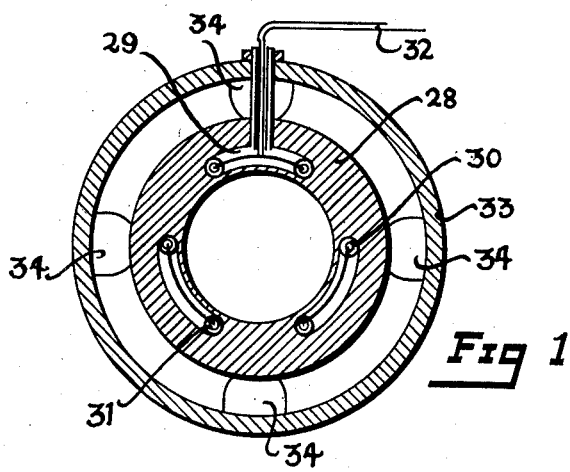
Fig. 1 is a sectional end view of the primary electric heater. This view is taken on line 1—1 of Fig. 2, looking in the direction indicated.

My device is primarily intended to be used in conjunction with heating units. It is particularly adapted to be used in conjunction with a domestic and commercial furnace 1. In order to fit the heating device within the fire box 2 of the furnace I provide a base ring 3 and a top ring 4 spaced apart sufficiently to permit the placing of a compressible non-combustible ring band 5 between the rings 3 and 4 and in order that the same may be made to adjustably engage the inner wall 6 of the furnace.

I provide an annular elliptically shaped air heater 7 within the fire box. The air heater 7 is composed of similar top and bottom plates each of which has a peripheral flange 8 disposed therearound and a baffle plate or diaphragm 9 is placed therebetween. The baffle plate and the flanged top and bottom plates are secured together by common fastenings 10. The air is heated preliminary to its entry into the combustion chamber. It is admitted through any suitable opening 11 in the bottom plate of the heater 7. It is admitted below the diaphragm 9. A plurality of spaced holes 12 are disposed adjacent the outer edge of the diaphragm 9. The spaced holes 12 are made relatively small and are closely positioned relative to each other to form a perforated plate through which the air passes and is diffused from the bottom space 13 into the top space 14 of the preliminary air heater.

Figure 4:
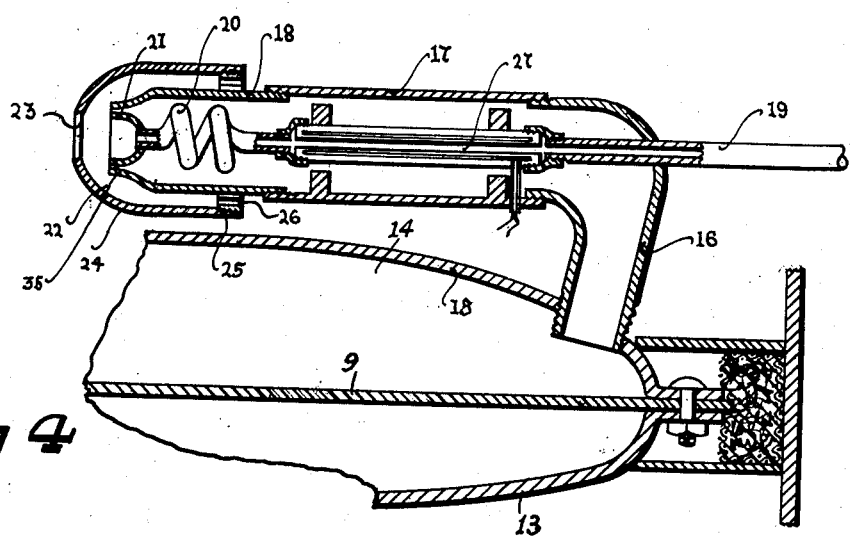
Fig. 4 is a fragmentary sectional side view of the heating device and is made to particularly illustrate the primary air heater and to illustrate a burner head used in conjunction therewith.

A burner head is secured to the top plate 15 as illustrated in Fig. 4 and the heated air enters through the elbow 16 and then passes longitudinally through the burner head and through the cylindrical shell 17 and outward therefrom through the nozle 18. The fuel to be burned whether a non-compressible or a compressible fluid is admitted into the burner head through a feeding pipe 19.

The fuel entering the pipe 19 passes through a heating chamber and thence through a coil 20 having a plurality of turns disposed therein and emerges therefrom through a cup-shaped outlet 21. The vaporized fuel being released through the cup-shaped outlet 21 mixes with the heated air passing through the chamber 22 and mixes therewith at the point of discharge into the fire box and is then forced through the expansion of heated gases and passes through the outlet 23 of the hood 24. A ring 25 is disposed between the nozzle 18 and the enlarged end of the hood 24 and a plurality of spaced ports 26 extend through the ring 25. Heated air from the fire box flows through the ports 26 and enters the space between the hood 24 and the nozzle 18.

Figure 2:
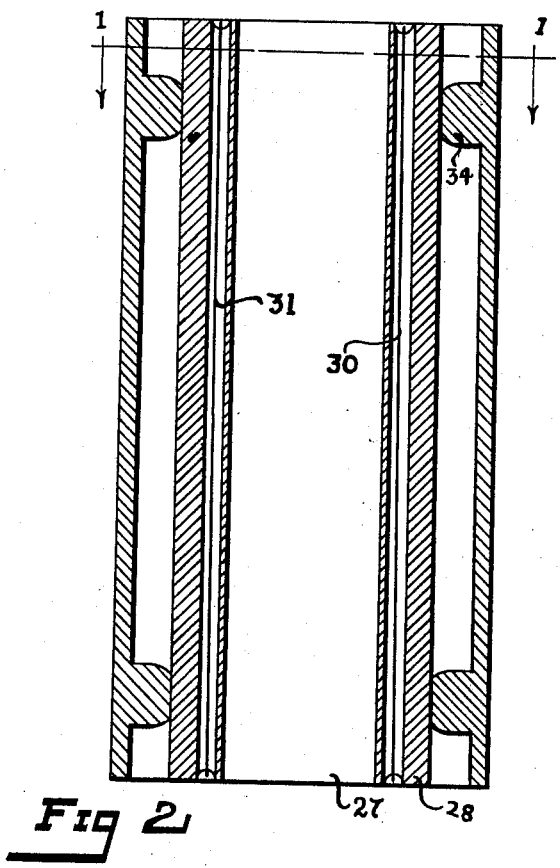
Fig. 2 is a sectional side view of the primary electric heater, illustrated in Fig. 1.
Figure 3:
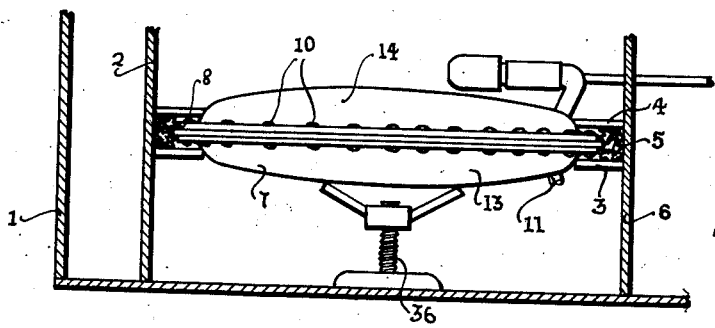
Fig. 3 is a fragmentary side view of a furnace fire box and illustrates one of my new devices therein and in side view.

Referring to Figs. 1 and 2, a central passageway 27 is provided within the primary heater. The primary heater is comprised of a central core 28. The core 28 has a plurality of enclosed electric heat elements, here shown as three in number at 29, 30 and 31. These heat elements are supplied with electric current from a source of supply not here shown, by electric conductors 32. The central heating core 28 is made of suitable material, either metallic or non-metallic and the heating elements 29, 30 and 31 are placed in such a position so that the greatest heat may be radiated into the central passageway 27. An outer shell 33 is spaced apart from the central core 28 and the spaced relation is maintained by inwardly extending knobs 34 that maintain a definite spaced relation between the central core and the outer shell 33 which will allow space through which air from the preheater may pass to be thereby heated to a greater degree.

Fluid fuel passing through the pipe 19 and through the passageway 27 is heated by the electric heating elements to the desired degree of heat and the air passing through the elbow 16 is intensified in its heat and the same then flows through restricted orifices 35 or in the form of a cylindrical sheet formation to enter the mixing compartment 22. The hood 24 is threadedly secured to the ring 25 and the spaced relationship between the discharge ends of the nozzle 18 and the orifice 23 disposed within the hood 24 may be varied to meet the burning requirements of the fuel being used.

After sufficient heat has been developed within the fire box the electric current supplied the core 28 may be entirely shut off, or heat in less amount may be supplied therethrough by suitable control mechanism.

The entire burner head assembly may be positioned within the furnace by any suitable supporting and positioning jack 36.

Figure 5:
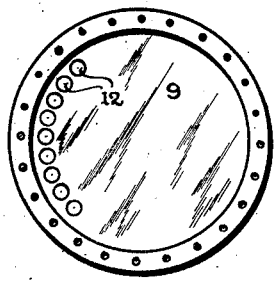
Fig. 5 is a plan view of the diaphragm disposed within the air heater.

Increased operating efficiency on vapor fuels may be obtained by use of the mechanism illustrated in Fig. 5. The vapor fuel, as gas to be burned is delivered into the heating chambers of the disc-shaped primary heater 37 through the inlet pipe 11. After the same is heated sufficiently it flows outward from the burner head 38 and a proper amount of air may be admitted thereinto by providing an entryway 39 at the base of the burner head 38. The heated air is permitted to enter the fuel stream and to furnish oxygen thereto for combustion.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow:

I claim:

1. A liquid fuel burner comprising a hollow body, means for supporting said body in a furnace firebox, said body having an air intake opening in an end wall thereof, a perforate partition supported within said body, an outlet tube connected at one end to said body and at the opposite end from said intake opening, a nozzle secured to the opposite end of said tube, a fuel supply pipe extending through a portion of said tube and terminating in said nozzle, electrically heated means associated with said fuel pipe within said tube, and a cup-shaped member carried by the terminal end of said supply pipe and disposed in spaced relation to the walls of said nozzle whereby the air in said nozzle may pass over the marginal edges of said member.

2. A liquid fuel burner comprising a hollow body, means for supporting said body in a furnace firebox, a perforate partition supported within said body and dividing said body into inlet and outlet chambers, said body having an air intake opening in said inlet chamber, an outlet tube connected at one end to the outlet chamber of said body, a part having a reduced end secured to the opposite end of said tube, a tubular coil disposed within said tube, and immediately adjacent the nozzle end of said tube a fuel supply pipe connected to one end of said coil, electrically heated means associated with said fuel pipe within said tube and a cup-shaped member secured to the opposite end of said coil and disposed within said reduced end of said part with the marginal edge portion thereof disposed in spaced relation to the adjacent surface of said reduced end whereby the air in said nozzle may pass over the marginal edges of said member.

3. A liquid fuel burner comprising a hollow body, a plate extending transversely across said body and dividing said body into inlet and outlet chambers, said plate having openings therethrough adjacent the outer portions thereof providing communication between said chambers adjacent the walls of said body, an outlet tube connected at one end to the outlet end of said chamber of said body, a cup secured to the opposite end of said tube and having a reduced end, a tubular coil within said tube, a fuel supply pipe connected to one end of said coil, electrically heated means associated with said fuel pipe within said tube, a cup-shaped member secured to the opposite end of said coil and disposed within said reduced end of said part with the marginal edge portions thereof disposed in spaced relation to the adjacent surface of said reduced end whereby the air in said part may pass over the marginal edges of said member.

4. A liquid fuel burner comprising a hollow body, a perforate partition supported within said body and dividing said body into inlet and outlet chambers, said body having an air intake opening in said inlet chamber, an outlet tube connected at one end to the outlet chamber of said body, a nozzle secured to the opposite end of said tube, a tubular coil disposed within said tube, a fuel supply pipe connected to one end of said coil, electrically heated means associated with said fuel pipe within said tube, a cup-shaped member secured to the opposite end of said coil and disposed within said nozzle, said member having the marginal edges thereof spaced from the adjacent surface of said nozzle whereby air may pass over the marginal edges of said member, a hood disposed about the forward end of said nozzle and having an axial opening confronting said nozzle, and means securing said hood to said nozzle, said means provided with openings admitting air between the adjacent surfaces of said hood and said nozzle.

5. A liquid fuel burner comprising a hollow body, means for supporting said body in a furnace firebox, said body having an air intake opening in an end wall thereof, a perforate partition supported within said body and dividing said body into inlet and outlet chambers, an outlet tube connected at one end to one end of the outlet chamber of said body, a nozzle secured to the discharge end of said tube, a fuel supply pipe extending axially through said tube and terminating in said nozzle, electrically heated means associated with said fuel pipe within said tube, said pipe including a spiral portion providing a coil within said tube, said coil being disposed within said nozzle, and a cup-shaped member carried by the terminal end of said supply line and being disposed at the nozzle end of said coil and disposed in spaced relation to the walls of said nozzle whereby the air in said nozzle may pass over the marginal edges of said member.

CHARLES V. HADJEFF.